(12) United States Patent  
Jalbert et al.

(10) Patent No.: US 8,166,922 B2
(45) Date of Patent: May 1, 2012

(54) METHOD AND SYSTEM FOR PROVIDING PREIDENTIFIED PETS SELECTIVE ACCESS TO A PREDETERMINED LOCATION OR OBJECT

(75) Inventors: David B. Jalbert, Coventry, RI (US);
Troy A. Hexter, Avon, CT (US);
Michael D. Morrissey, Southington, CT (US)

(73) Assignee: Vet Innovations, LLC, Avon, CT (US)

( * ) Notice: Subject to any disclaimer, the term of this patent is extended or adjusted under 35 U.S.C. 154(b) by 137 days.

(21) Appl. No.: 12/501,850

(22) Filed: Jul. 13, 2009

(65) Prior Publication Data

US 2010/0132629 A1 Jun. 3, 2010

Related U.S. Application Data

(60) Provisional application No. 61/118,710, filed on Dec. 1, 2008.

(51) Int. Cl.
*A01K 5/02* (2006.01)

(52) U.S. Cl. ............ 119/501; 119/712; 119/62; 119/63; 119/59

(58) Field of Classification Search .................. 119/501, 119/62, 63, 52.5, 57.9, 59, 712; *A01K 5/02*
See application file for complete search history.

(56) References Cited

U.S. PATENT DOCUMENTS

| | | | |
|---|---|---|---|
| 3,897,753 A | 8/1975 | Lee et al. | |
| 5,570,655 A | 11/1996 | Targa | |
| 5,603,287 A * | 2/1997 | Houck | 119/719 |
| 5,669,328 A | 9/1997 | Lanfranchi | |
| 6,044,795 A | 4/2000 | Matsuura et al. | |
| 6,349,671 B1 | 2/2002 | Lewis et al. | |
| 6,446,574 B2 | 9/2002 | Bickley | |
| 7,073,461 B2 | 7/2006 | Gonet | |
| 7,124,707 B1 * | 10/2006 | Clarke | 119/51.02 |
| 7,228,816 B2 | 6/2007 | Turner et al. | |
| 7,395,782 B1 * | 7/2008 | Lindsay | 119/51.02 |
| 7,426,901 B2 | 9/2008 | Turner et al. | |
| 7,874,265 B1 * | 1/2011 | Addleman | 119/63 |
| 2002/0134313 A1 * | 9/2002 | King et al. | 119/51.02 |
| 2005/0061252 A1 | 3/2005 | Meeks et al. | |
| 2005/0252622 A1 * | 11/2005 | Reid | 160/180 |
| 2007/0125306 A1 | 6/2007 | Beecher | |
| 2008/0105205 A1 * | 5/2008 | Goehring | 119/51.02 |

FOREIGN PATENT DOCUMENTS

JP 2006144226 A * 6/2006

OTHER PUBLICATIONS

English Translation of JP2006144226A- see attached.*

* cited by examiner

*Primary Examiner* — Kimberly Berona
*Assistant Examiner* — Marisa Conlon
(74) *Attorney, Agent, or Firm* — Barlow, Josephs & Holmes, Ltd.

(57) ABSTRACT

A method and system is provided that controls pet access to various different locations and/or objects. In a preferred embodiment, the present invention provides an automated system whereby pets wearing an ID tag are allowed access to various locations and/or objects, such as food contained within a feeder dish for example, while a sensor system, responding to the presence of other animals or people, causes the device to close preventing unauthorized access thereto. The feeder further includes one or more sensors using ultrasonic, infrared technology or both in combination for the identification of both tagged and non-tagged animals or children. Further embodiments employ the system to control access to litter boxes, pet toys, pet watering systems, pet gate access, pet containment systems or pet doors.

15 Claims, 9 Drawing Sheets

METHOD AND SYSTEM FOR PROVIDING PREIDENTIFIED PETS SELECTIVE ACCESS TO A PREDETERMINED LOCATION OR OBJECT

CROSS-REFERENCE TO RELATED APPLICATIONS

This application is related to and claims priority from earlier filed U.S. Provisional Patent Application No. 61/118,710, filed Dec. 1, 2008.

BACKGROUND OF THE INVENTION

The present invention relates generally to a method and system for providing pets with controlled access to various different locations and/or objects. More specifically, in the preferred embodiment, the present invention relates to an automated system whereby pets wearing an ID tag are allowed access to various locations and/or objects, such as food contained within a feeder dish for example, while a sensor system, responding to the presence of other animals or people, causes the device to close preventing unauthorized access thereto.

It should be noted by one skilled in the art that while the technology of the present invention is presented in the context of a preferred embodiment pet feeder dish such disclosure is meant only to be illustrative and is not intended to limit the scope of this invention to a particular configuration. It is also intended within the scope of the present invention that the method and system disclosed herein can be applied equally for controlling access to litter boxes, pet watering systems (including circulating and outside of the house non circulating), pet toys, pet crates, pet gate access, pet doors, pet beds and pet containment systems. Accordingly, the general scope of the method and system are directed to the pet identification and access control technology and not to a specific embodiment. This provides a broad range of pet products that are improved in the context of the method and system of the present invention.

Generally the technology disclosed herein has been discussed in the prior art only in the context of controlled access feeders. It is well known that some animals are restricted to certain diets for many reasons ranging from the type or breed of animal, the age of the animal, the animal's weight or even specific health issues, such as diabetes for example. However, it is often inconvenient based on the pet owner's schedule to accommodate the dietary needs of the animal. This is particularly true when the pet owner has more than one pet, each requiring different dietary needs. The net result is that feeding time can become an issue for not only the pet owner but also for the pet leading to further aggravation of the above listed issues and the creation of new issues where none existed before. In addition, the presence of young children who may try to eat pet food poses yet a further problem for pet owners.

In an attempt to resolve these issues there is a need for a pet feeding system that can be set to automatically recognize and operate for a specific pet. In response there are various types of "automatic" animal feeding devices disclosed in the prior art. There are several devices that generally fall into a few distinct categories. One category of devices relies upon timer mechanisms that are programmed to operate on a 24-hour timetable. When a predetermined elapsed time or specific clock time is met, the device opens to allow the animal access to the food. Other devices simply depend on the pet to self regulate its consumption of food and simply include a bulk storage device that automatically fills an exposed bowl by gravity feed or similar method.

Still other systems in the prior art control access to the food contained therein based on the presence of the pet at the feeding device. More particularly, as described in U.S. Pat. No. 5,570,655 (Targa); and U.S. Pat. Nos. 3,897,753 and 4,036,178 (Lee et al.) a complex control system is provided that generates an electric field around an open food receptacle. An animal wearing a special collar that is provided with a conductive portion to alter the electric field signals to the system when the proper animal approaches the device. In response to the signal from the proper animal, a shock or other signal-generating device is disabled thereby allowing the proper animal to access the dish. Should an animal not wearing the special collar reach over the lip of the dish and make contact with the metallic strip thereon, the animal receives a shock that frightens the animal away from the dish. Alternately, instead of the conductive collar, the device can employ radio frequency ("RF") technology. In another alternate embodiment, upon identifying the presence of the proper animal, the device activates a hopper that operates to fill a food receptacle. While these devices appear to have the ability to distinguish between those animals entitled to access and those who are not, the use of a shock to repel an animal may be deemed to be inhumane. Further, as the food is always exposed in the dish, this creates the risk that small children in the household will play with or eat the pet's food. Still further, these devices do not solve the problem of small children or other non-tagged animals accessing the food simultaneously in conjunction with the proper animal.

Similarly, U.S. Pat. No. 5,669,328 (Lanfranchi) provides a cone-shaped device that partially opens when a receiver positioned within the device receives a signal from a collar on a pet. There is no ability for the system to close should a non-tagged animal push the tagged animal away and feed while the tagged animal remains nearby. Also, since only a small triangular opening is provided for feeding, it is possible that the animal will get its head stuck in the device making it unlikely that the proper animal would to want to return to such a device.

U.S. Pat. No. 6,044,795 (Matsuura et al.) shows an animal tag having a memory for storing a history of the animal feeding times. The device samples the tag every 10 minutes and, if the animal is present, dispenses food to a separate dish. As is the case with the other prior art discussed herein, the food is exposed once dispensed, making it available for other animals or children to access. This device also appears rather complicated, especially when it is considered that it can only feed one animal. Further, the manufacturing cost of such a device is greatly increased by requiring the tag to have a memory and the controller to interact with that memory.

U.S. Pat. No. 7,073,461 (Gonet) shows a feeder that senses all animals and/or children proximate to the feeder, however, it does not discriminate between any and provides access to the food to all animals and people. Similarly, U.S. Pat. Nos. 7,228,816 and 7,426,901 (Turner et al.) discloses a pet feeding system that also operates based on identifying animals with tags, however, it also does not solve the issues related to non tagged animals or small children being present while the tagged animal is present. In addition the system requires a complex system for moving the food bowl from inside the feeder to the outside. In addition the feed system can easily trap the animal as it is closing should the pet try to keep it open.

In view of the prior art, there is a need for an automatic system that uncovers food contained therein when the assigned pet approaches allowing the animal to eat the specific food the owner has placed in that feeder while also recognizing all other animals in its proximity in order to cover the food or keep it covered when those animals or people approach. There is a further need for a system that excludes pets from one feeder while allowing access to yet another feeder so that they may be able to eat the food they require. Still further there is a need for a simplified pet feeding system that controls access by a plurality of animals to food, which can provide the correct food safely to the correct animal and is relatively less complex and cost-effective in regard to its use and operation.

Alternately there is a need for applying this identification and access control technology to litter boxes where there is a need to prevent dogs and small children from getting into cat litter boxes. Litter boxes are by nature not a clean environment. The possibility that children or other household pets such as dogs may enter a litter box represents a health hazard to the children of families with cats. To date litter box prior art is limited to varying techniques for cleaning the litter boxes of clumped litter and other waste products, not to the health issues associated with this dirty environment and the free access all creatures have to these products.

Still further there remains an alternate need to apply the identification and access control technology to pet watering systems including circulating and outside of the house non circulating, pet toys, pet crate and gate access, pet doors, pet beds, and pet containment systems. These products can all be significantly improved from the addition of this technology resulting in improved health and safety of both pets and family members for households with pets.

BRIEF SUMMARY OF THE INVENTION

In this regard, the present invention provides a method and system provided that controls pet access to various different locations and/or objects. More specifically, in a preferred embodiment, the present invention provides an automated system whereby pets wearing an ID tag are allowed access to various locations and/or objects, such as food contained within a feeder dish for example, while a sensor system, responding to the presence of other animals or people, causes the device to close preventing unauthorized access thereto.

In a first embodiment, the present invention is disclosed as a single bowl pet feeder. Generally the feeder includes a body or housing that has a door guide track therein and a food bowl located in the interior of the body. During normal operation the door in the guide track is closed thereby covering the food bowl making it inaccessible to either animals or small children. The feeder further includes one or more sensors on the top and/or front face for the identification of both tagged and non-tagged animals or children. Preferably the sensors function using RFID technology, ultrasonic, infrared technology or combinations thereof to verify that there is only the target or approved animal in close proximity to the feeder.

In operation, as a tagged pet approaches the feeder, one sensor identifies if the tag is authorized. If the tag is authorized or approved, the door opens to allow the pet access to the food contained therein. When the tagged pet departs, the door closes preventing access to the food. In contrast to the prior art, the present invention also employs additional sensors to determine the presence of other non-tagged animals or children. Should such a presence be detected (even when a authorized tagged pet is accessing the feeder) the door is closed thereby preventing a non-tagged animal or child from accessing the food contemporaneously with the tagged pet. In addition, should a non authorized tagged pet approach the feeder the sensors will pick up that and will close the door.

It is also within the scope of this invention that sensors alone be employed to identify the target animal as contrasted to the non-target pet or person. In this regard, the sensors will identify the visible, infrared or ultrasonic signature of the target animal and only operate when that signature is detected. The approved "signature" data is programmed into the feeder control at first set-up. Additional and/or non-matching signatures will cause device to close. As was stated above this pet identification technology is also disclosed in an alternate embodiment in the context of litter boxes. Another embodiment discloses pet watering systems including circulating and outside of the house non circulating watering dishes. Still a further embodiment depicts pet gate access, pet containment systems or pet doors. All totaled the pet identification and access control technology can be applied across a broad range of pet products.

It is therefore an object of the present invention to provide an automatic system that uncovers food contained therein when the assigned pet approaches allowing the animal to eat the specific food the owner has placed in that feeder while also recognizing all other animals in its proximity in order to cover the food or keep it covered when those animals or people approach. It is a further object of the present invention to provide a system that excludes pets from one feeder while allowing access to yet another feeder so that they may be able to eat the food they require. It still a further object of the present invention to provide a simplified pet feeding system that controls access by a plurality of animals to food, which can provide the correct food safely to the correct animal and is relatively less complex and cost-effective in regard to its use and operation. It is yet a further object of the present invention to provide a system that provides selective control and access to other pet related items such as litter boxes, pet watering systems including circulating and outside of the house non circulating, pet toys, pet crate and gate access, pet doors, pet beds, and pet containment systems.

These together with other objects of the invention, along with various features of novelty that characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In the drawings which illustrate the best mode presently contemplated for carrying out the present invention.

DETAILED DESCRIPTION OF THE INVENTION

Now referring to the drawings, a method and system is provided that controls pet access to various different locations and/or objects and more specifically, in the preferred embodiment, as depicted at FIGS. 1-4, provides an automated system whereby pets wearing an authorized ID tag are allowed access to various locations and/or objects, such as food contained within a feeder dish for example, while a sensor system, responding to the presence of other animals or people, causes the device to close preventing unauthorized access thereto. Pets wearing a non-authorized ID tag also cause the device to close preventing unauthorized access thereto.

In the most general embodiment of the present invention, a system is provided for controlling pet access to locations or objects. The system includes a location or object to be controlled, a means for preventing pet access to said location or object and a sensor system configured and arranged to selectively disengage the means for preventing pet access. The sensor system includes at least one tag that provides authorization to access the location or object wherein the at least one tag is preferably disposed on an authorized pet, a first sensor for controlling pet access by detecting the presence of the tag and disengaging the means for preventing pet access and a second sensor that detects the presence of an animal other than the authorized pet and engaging the means for preventing pet access.

It should be noted by one skilled in the art that while the technology of the present invention is presented most generally as a system for controlling pet access to locations or objects and that the invention is illustrated in the context of several preferred embodiments, such disclosure is meant only to be illustrative and is not intended to limit the scope of this invention to a particular configuration. It is also intended within the scope of the present invention that the method and system disclosed herein can be applied equally for controlling access to litter boxes, pet watering systems (including circulating and outside of the house non circulating), pet toys, pet crates, pet gate access, pet doors, pet beds and pet containment systems. Accordingly, the general scope of the method and system are directed to the pet identification and access control technology and not to a specific embodiment. This provides a broad range of pet products that are improved in the context of the method and system of the present invention.

Figure 1:
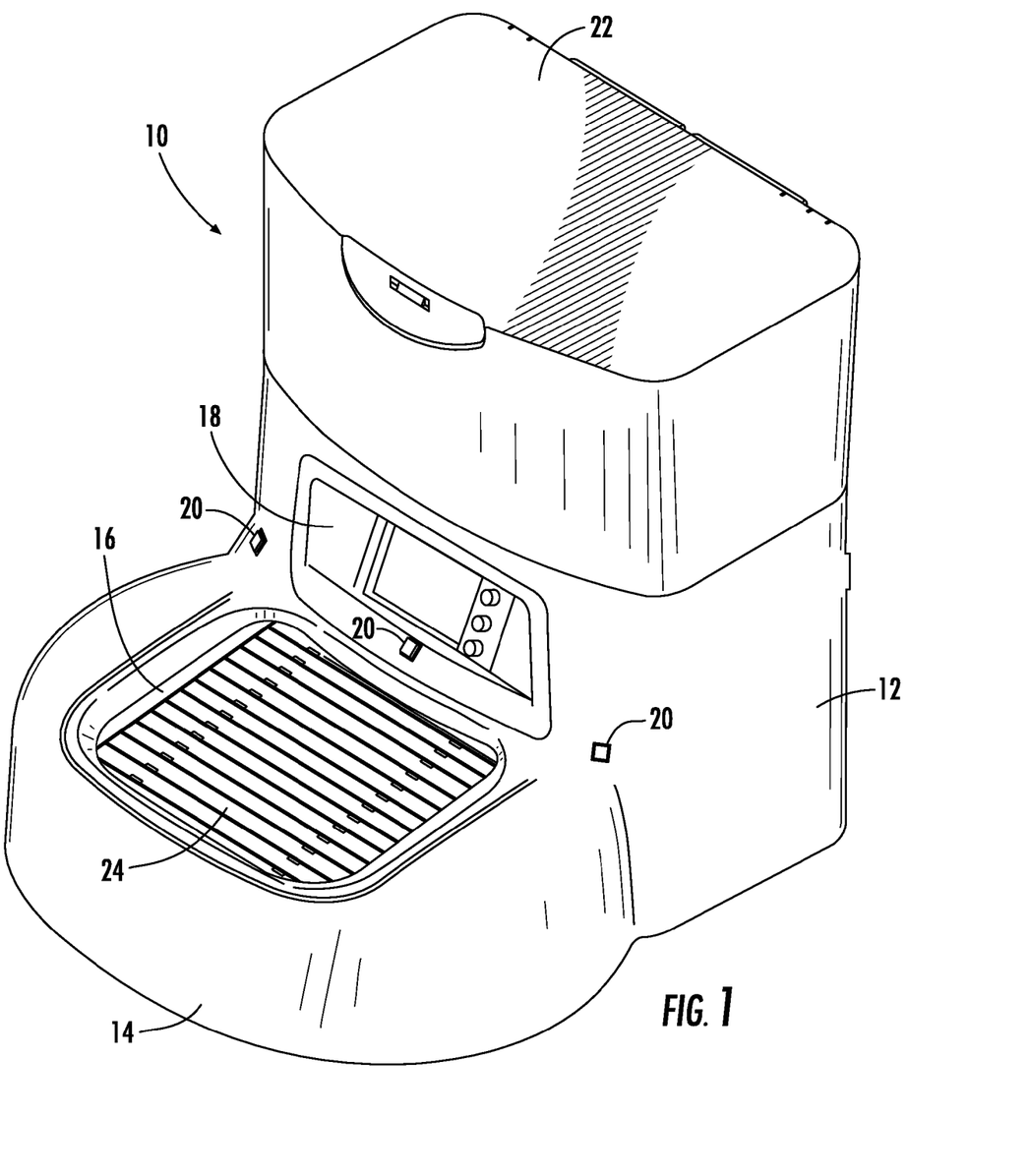
FIG. 1 is a front perspective view of a pet feeding dish in accordance with the teachings of the present invention.

Turning now to FIG. 1, the method and system of the present invention is specifically illustrated in the context of a pet feeder dish 10. The feeder dish 10 can be seen to include a housing 12 with a base portion 14 that includes a compartment 16 therein and electronics 18 for controlling the overall system. One or more sensors 20 can also be seen on the face of this base portion 14. The sensors 20 operate, as will be described in greater detail below, for the identification of both tagged and non-tagged animals or children. Preferably the sensors 20 function using ultrasonic, infrared technology or both in combination to verify that there is only the target or approved animal in close proximity to the feeder. In addition, electronic controls 18 are shown that include programming capability that may include a user interface including but not limited to buttons, switches and/or a liquid crystal display (LCD). A second compartment 22 can be seen on top of and extending upwardly from the base portion 14. The second compartment 22 is optionally provided as a food storage region so that rather than operate as a single feeding device, the feeder 10 can be operated on a controlled basis by dispensing food over a number of days with out needing to be refilled. Additionally, a means for controlling access to the food compartment can be seen in the form of a door 24. While a sliding door 24 is depicted herein, one skilled in the art can appreciated that the door may take any number of forms including but not limited to a sliding door, a hinged door that swings in or out, a rotary door, a pivoting door, a door that is displaced vertically or horizontally or any combination of the above functions. The only limitation is that the door 24 serves as a means to restrict and control access to the food contained within the compartment 16 in the housing 12.

Figure 2:
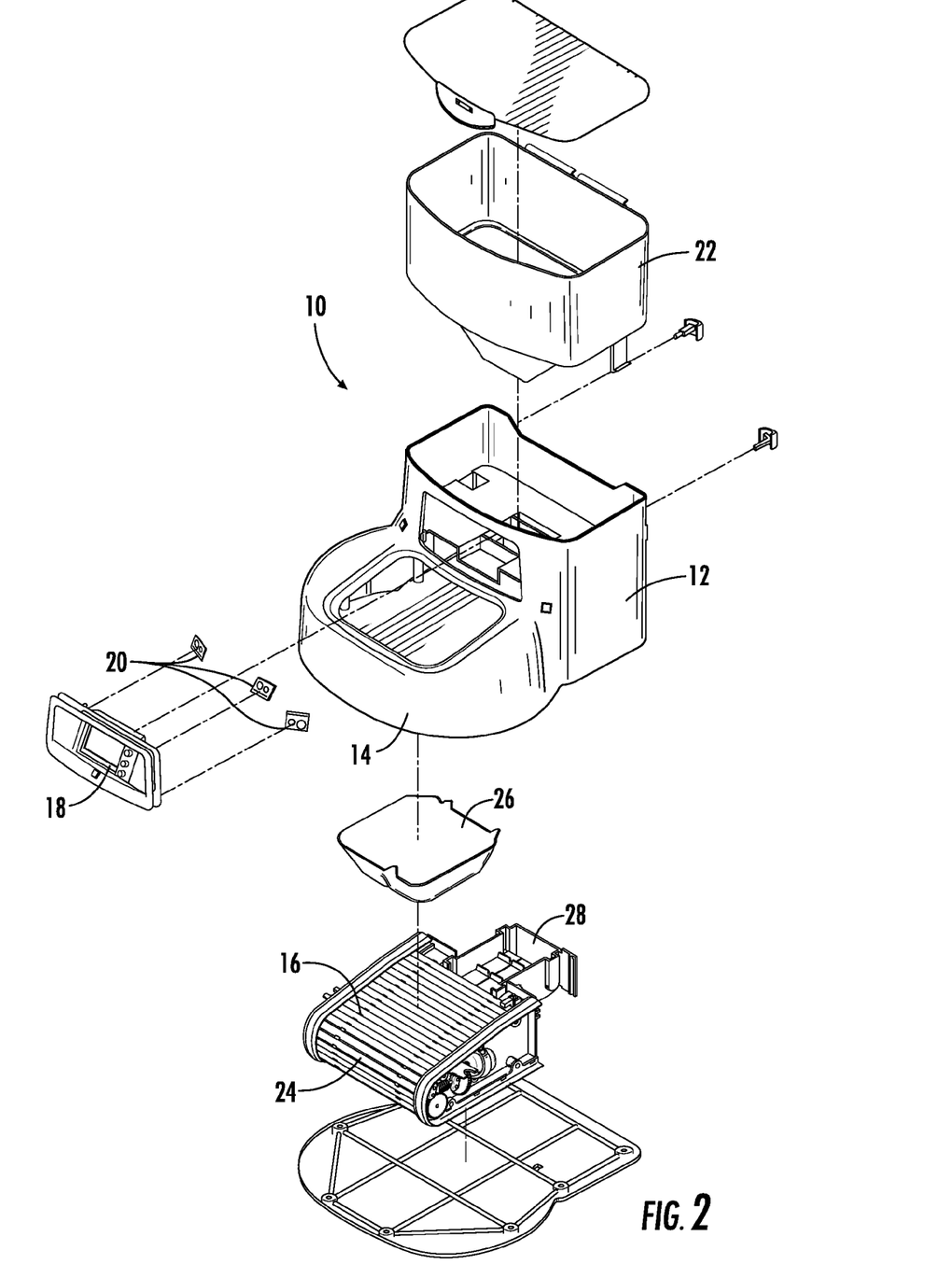
FIG. 2 is a front, exploded perspective view of the pet feeding dish of FIG. 1.

An exploded view of the pet feeder 10 can be seen at FIG. 2. In this figure the housing 12 can be seen to enclose a removable dish 26 within the means for controlling access 16. Further, the second upper compartment 22 can also be seen to be removable thereby allowing easy removal and cleaning of these components as they directly contact and house the pet food. Further, the housing 12 encloses a dispensing assembly 28 that is formed with the means for controlling access 16. This dispensing assembly 28 is shown to be formed as a single unit with the means for controlling access to facilitate manufacturing resources and costs although both assemblies may be made separate and apart from one another.

Figure 3:
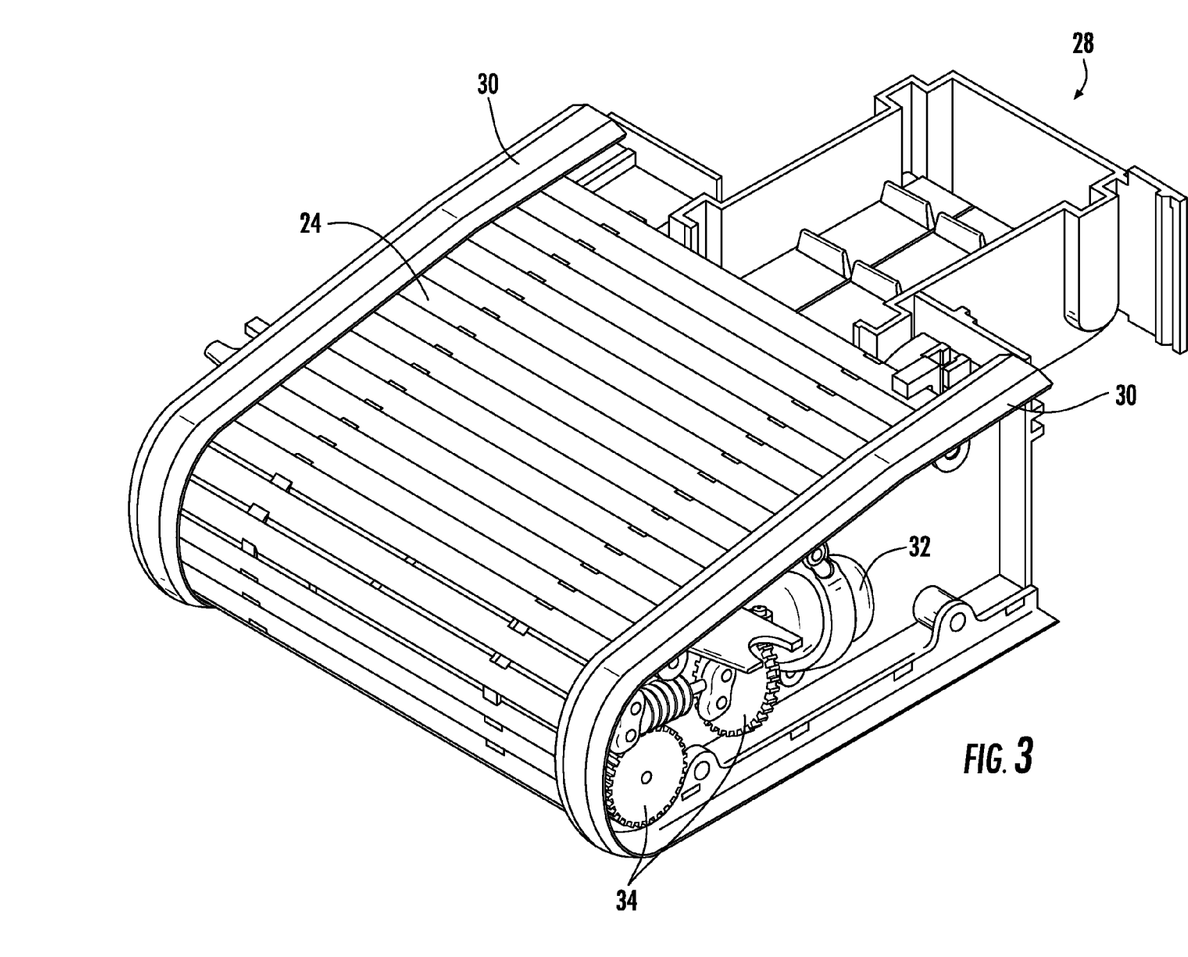
FIG. 3 is a perspective view of the controlled access portion of the pet feeding dish of FIG. 1.
Figure 4:
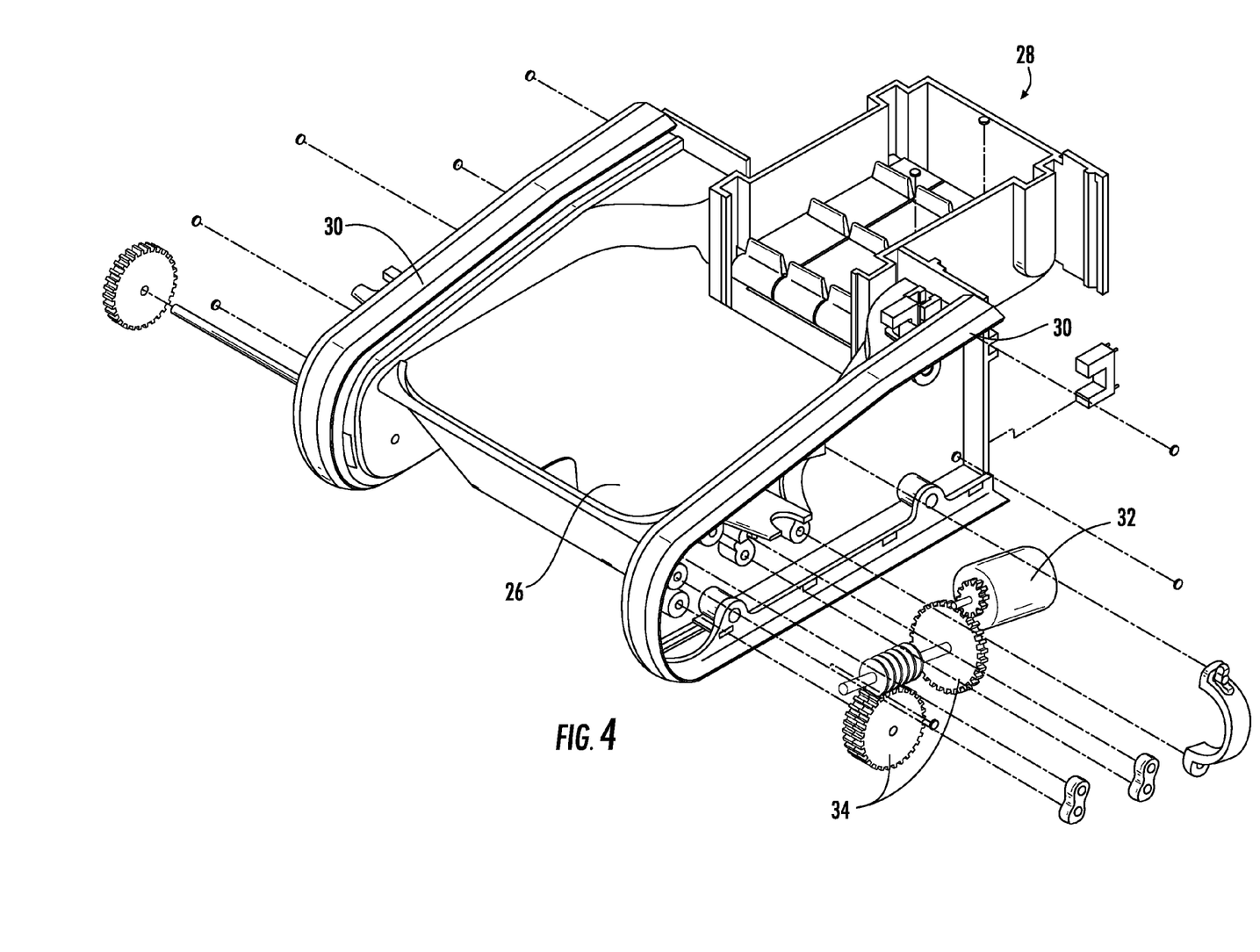
FIG. 4 is an exploded perspective view of the controlled access portion of FIG. 3.

FIGS. 3 and 4 provide a detailed illustration of the dispensing assembly 28 and the means for controlling access to the compartment containing the food dish 26. The door 24 is shown as being retractable and is preferably a segmented type door that allows it to slide freely within a track 30. This arrangement allows easy opening and closing of the door 24. Such operation is controlled by various motor 32 and gear 34 arrangements as are well known in the art. The notable features of the operation of the means for controlling access is that the operation of the control feature is controlled in such a way as to prevent a pet from being trapped. In this manner, if a pet gets caught by the door 24, it will pause to release the pet yet still try to close in a manner that urges the pet away from the compartment. Further, in this particular arrangement the door 24 slides from the lower front of the device to the upper rear of the device in a manner that nudges the pet out of the food dish 26. The food dispensing assembly 28 is operative to transport food from the food storage compartment 22 to the food dish 26 based on commands issued by the controls 18. The timing and frequency of this dispensing operation can widely vary and is not considered part of or a limitation on the present disclosure. Further, while a conveyor is depicted as a food dispensing assembly 28, various door, gate, rotational drums, hoppers and cup arrangements could also be used and still fall within the scope of the present invention. Visible light sensing and other sensors known to those skilled in the art are also potential technologies that may be employed to identify both tagged and non-tagged animals or children.

Generally, as can be seen at FIG. 3, the door 24, which is shown in a closed position thereby covering the food dish 26, making it inaccessible to either animals or small children. Not shown is an over ride switch witch is used by the owner to open the feeder for bowl filling and removal for cleaning. Additionally, the feeder includes one or more sensors 20 on the top and/or front face for the identification of both tagged and non-tagged animals or children. Preferably the sensors function using ultrasonic, infrared technology or both in combination to verify that there is only the target or approved animal in close proximity to the feeder.

Figure 5:
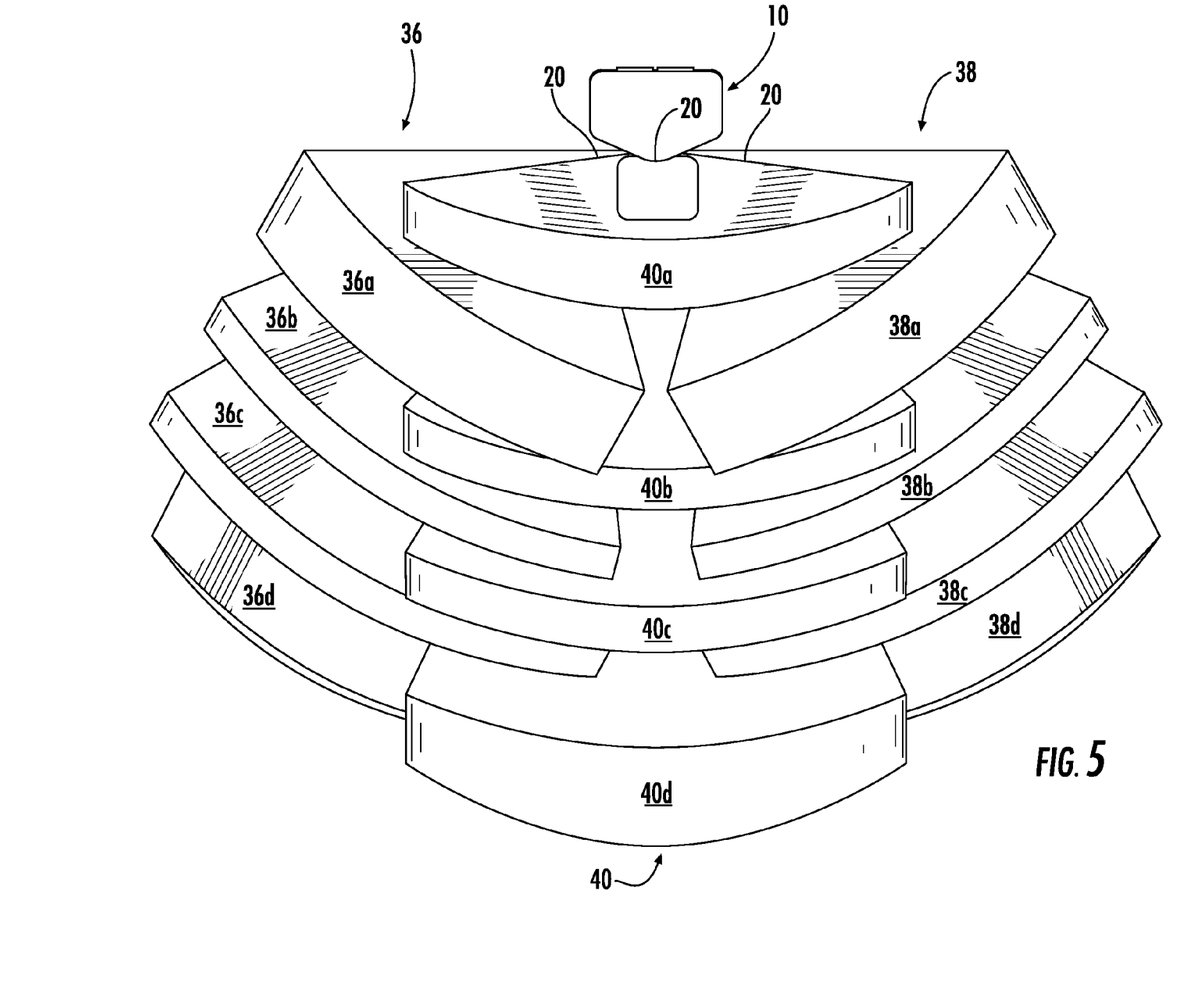
FIG. 5 is a representation of the various fields of view of the sensors employed in the system of the present invention.

In operation, as was stated above, the feeder 10 may employ infrared and ultrasonic sensors on their own or may employ in combination an RF or magnetic sensor that determines the presence of an authorized tag. A tag is established as authorized or non-authorized at initial set up of the logic system. It is important to note that the infrared and/or ultrasonic sensors are arranged to detect a plurality of discrete zones 36, 28, 40. One possible arrangement of the sensors 20 is depicted at FIG. 5. In particular, this embodiment depicts three separate sensors that respectively cover left 36, center 40 and right 38 zones relative to the device. Further, each of the sensors 20 is capable of discretely detecting input across a plurality of vertical heights relative to the base of the feeder. In other words, the left sensor can sense at several different vertical bands 36a, b, c, d, the center sensor can sense at several different vertical bands 40a, b, c, d and the right sensor can sense at several different vertical bands 38a, b, c, d. This arrangement would be similar regardless of the number and positioning of the sensors 20. By creating an array of sensors 20 in this manner, the device can collect information in order to assess the size of the animal trying to access the device, the number of separate animals present at the device and the general movement and direction of any animal(s) present. By applying logic to the collected sensor 20 input, the device can determine whether the only animal present is the authorized animal or if another animal is trying to access the device thereby triggering it to close.

Figure 6:
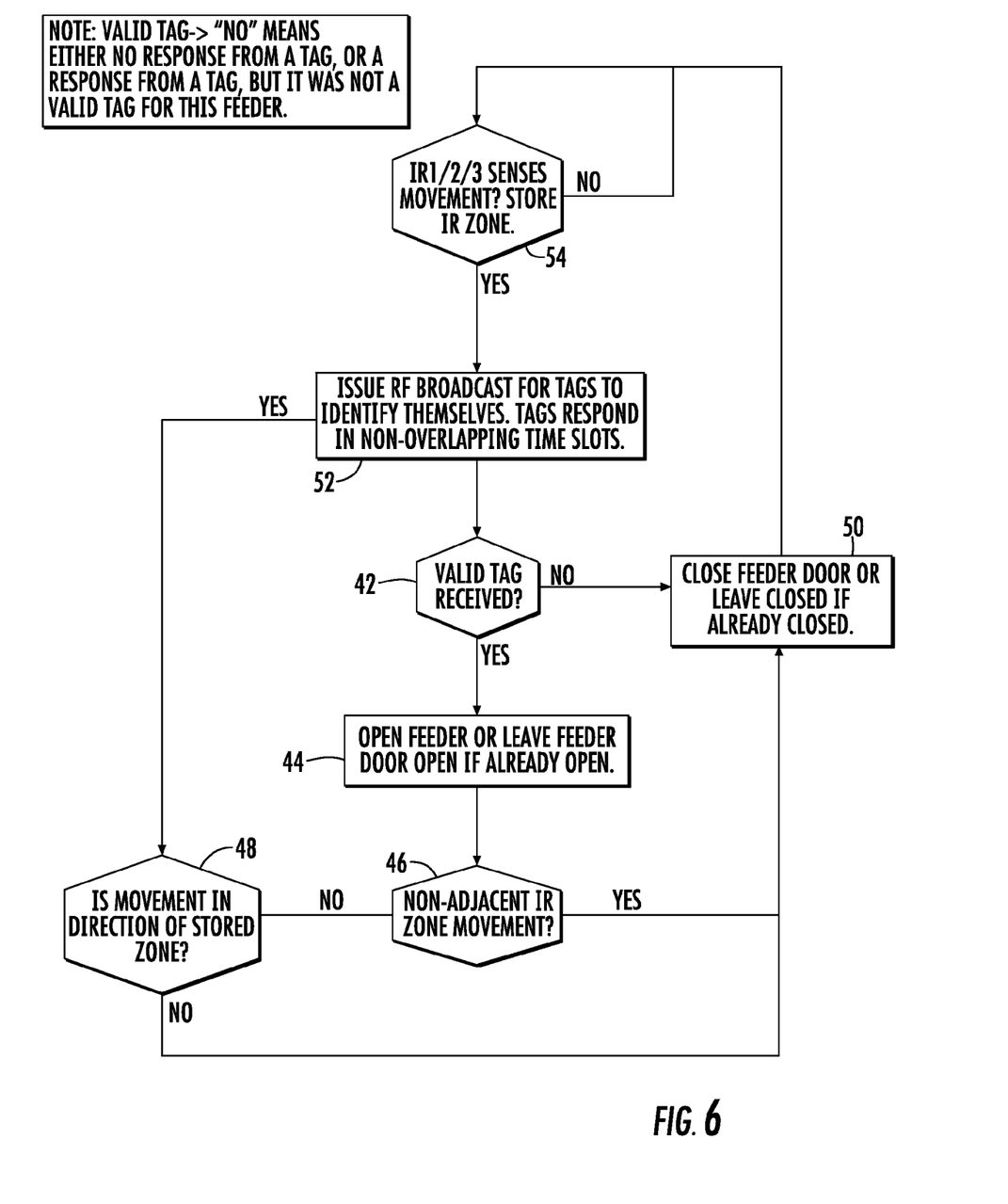
FIG. 6 is a flow chart describing the operation of the system of the present invention.

As is depicted at the flow chart at FIG. 6, in operation, as a tagged pet approaches the feeder, the system determines if the tag is authorized 42. If an authorized tag is present, the door opens to allow the pet access to the food contained therein 44. If the sensors determine that there is movement in one of the adjacent sensor zones 46 the system assesses whether the animal present is moving toward or away from the feeder 48. If the animal is moving away the feeder closes the door 50. On the other hand, if the animal is moving toward the feeder, the feeder polls for tags in the vicinity 52. If the tag is authorized 42, the feeder remains open 44, if there is no tag present or if the tag is not authorized, the feeder closes 50. Further, if the sensors detect animals in adjacent zones trying to access the feeder simultaneously 54 with the animal bearing the authorized tag, the door i closes regardless of the presence of the animal with the authorized tag in order to prevent access by the non-authorized animal.

It is also within the scope of this invention that sensors alone be employed to identify the target animal as contrasted to the non-target pet or person. In this regard, the sensors will identify the visible, infrared or ultrasonic signature of the target animal and only operate when that authorized signature is detected, additional or non-authorized signatures will cause device to close. The authorized signature is stored in the systems logic controller at initial set up.

Figure 7:
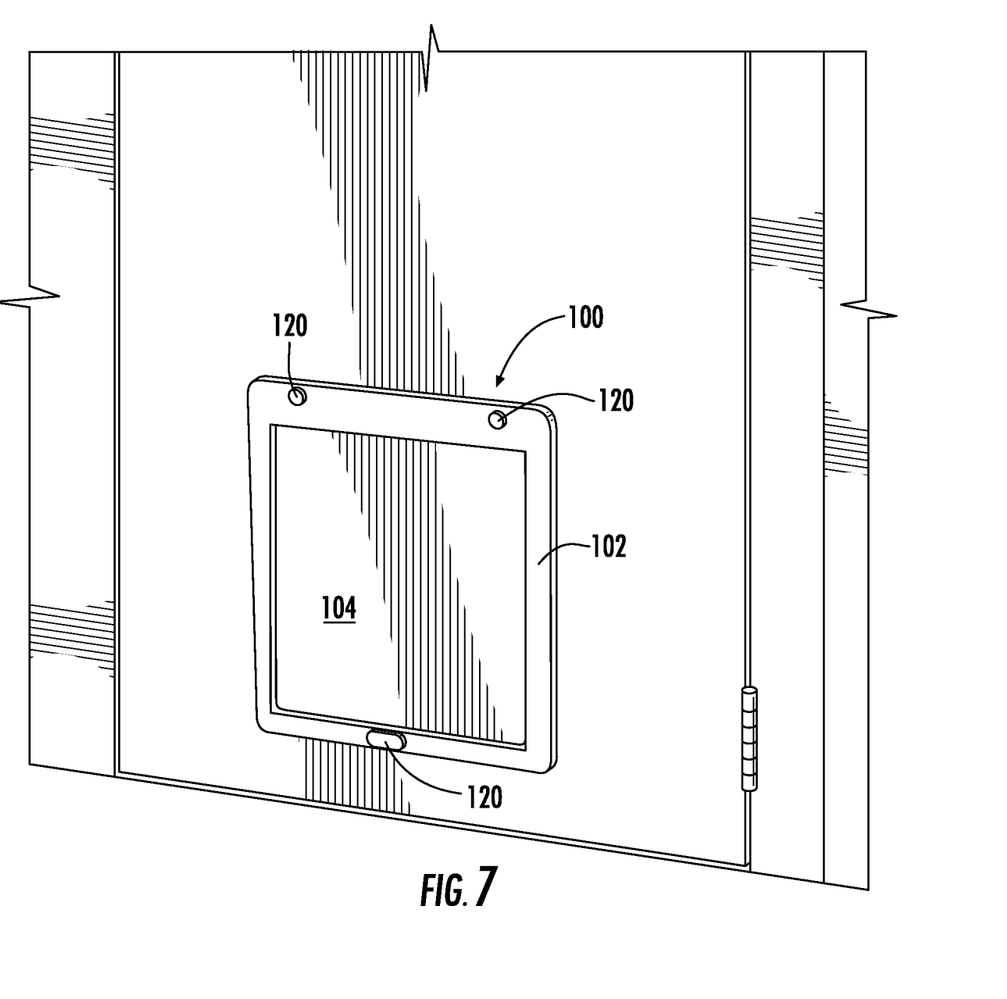
FIG. 7 is a perspective view of an alternate embodiment of the present invention in the context of a pet door.

Turning now to FIG. 7, an alternate embodiment is provided that depicts the teachings of the present invention in the context of a pet access door 100. The pet door 100 includes a frame 102 that is configured to be installed into an opening in a door or wall. A door 104 is provided within the frame 102 and serves as the means for preventing access. The door 104 is freely displaceable by an animal to an open position when a first sensor 120 detects the presence of said at least one authorized tag. However the door 104 is latched in a closed position when one of the other sensors 120 detects the presence of an animal other than the animal bearing the authorized tag. As was the case above, should the second sensor 120 detect the presence of an animal other than the authorized pet, the door 104 remains latched or closes even if the first sensor 120 detects the presence of the authorized tag.

Figure 8:
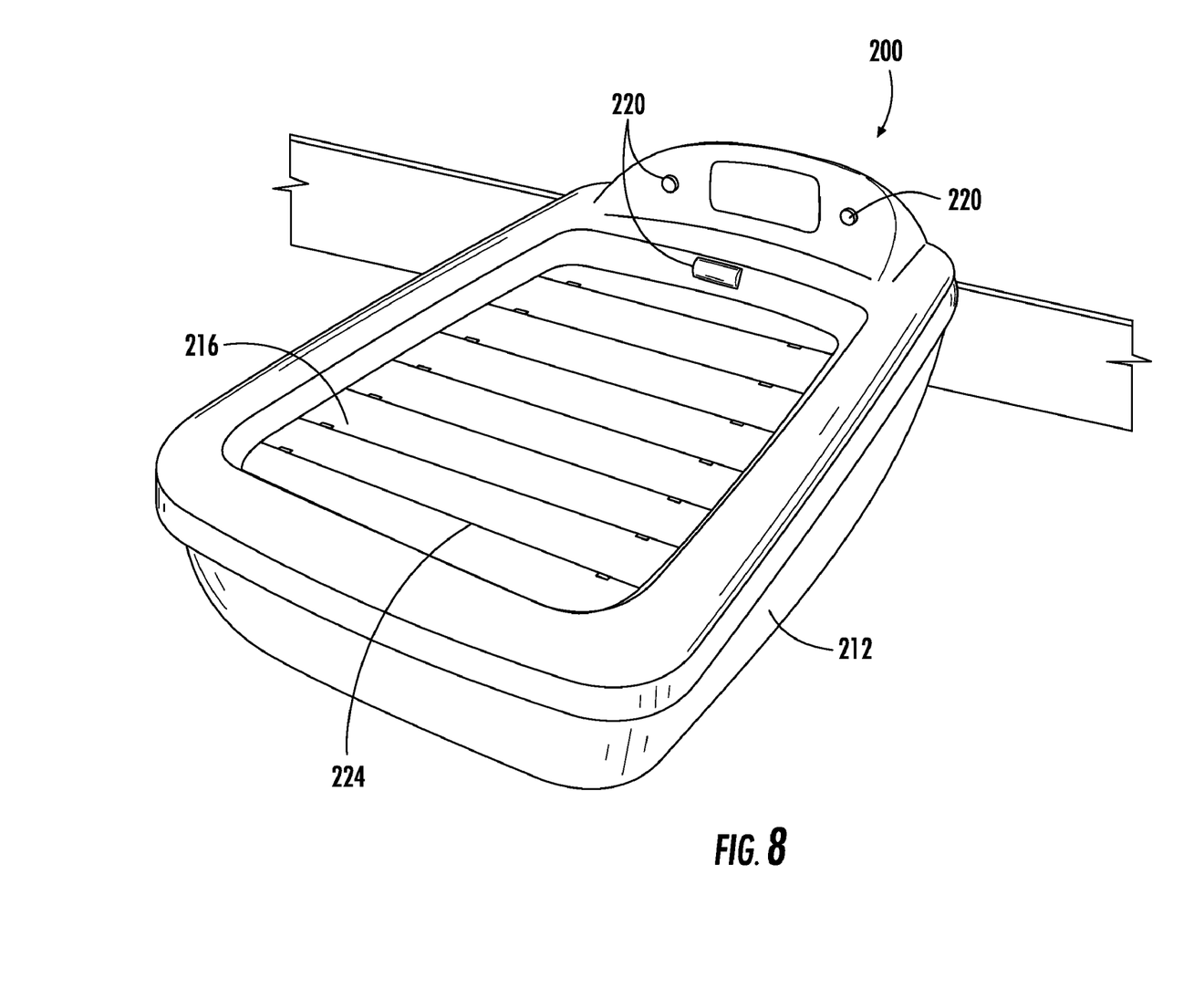
FIG. 8 is a perspective view of an alternate embodiment of the present invention in the context of a litter box.

FIG. 8 depicts another an alternate embodiment in the context of a litter box 200. The litter box 200 also has a housing 212 with a compartment 216 therein. In this case the compartment 216 is a litter compartment. The means for preventing access is a door 224 that moves between an open position when said first sensor 220 detects the presence of said at least one authorized tag and a closed position when said second sensor 220 detects the presence of an animal other than the authorized pet. This system can be used in conjunction with known methods of odor and/or waste elimination.

Figure 9:
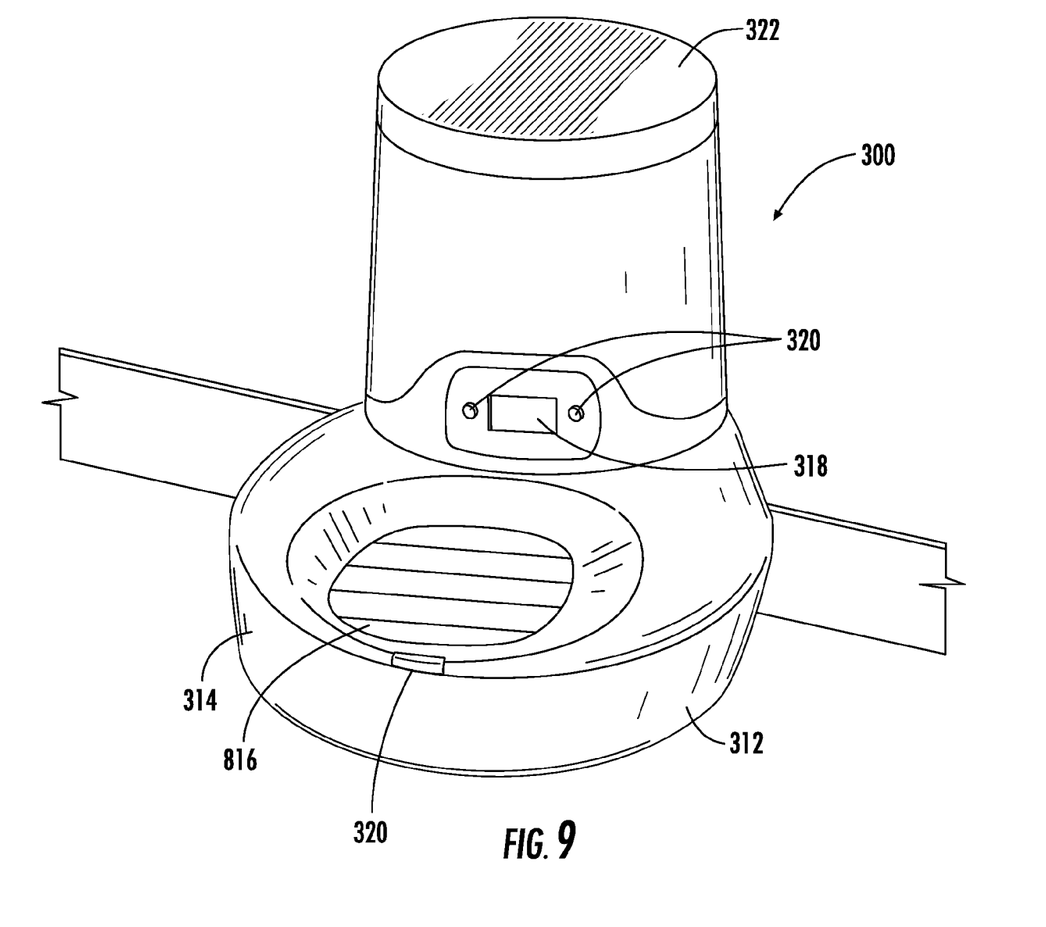
FIG. 9 is a perspective view of an alternate embodiment of the present invention in the context of a watering dish.

In still a further embodiment, FIG. 9 depicts the teachings of the present invention in the context of a pet watering device 300. Much in the same manner as described above, with respect to the feeder, the pet watering device 300 includes a housing 312 with a base portion 314 that includes a compartment 316 therein and electronics 318 for controlling the overall system. One or more sensors 320 can also be seen on the face of this base portion 314. In addition controls are shown that include programming capability that may include a user interface including but not limited to buttons, switches and/or a liquid crystal display (LCD). A second compartment 322 can be seen on top of and extending upwardly from the base portion 314. The second compartment 322 is provided as water reservoir region. Additionally, a means for controlling access to the water compartment 316 can be seen in the form of a door 324. The door 324 moves between an open position when said first sensor 320 detects the presence of said at least one authorized tag and a closed position when said second sensor 320 detects the presence of an animal other than the authorized pet. This system can be used in conjunction with known methods of water filtration.

It can therefore be seen that the present invention provides an automatic system that provides selective control and access to other various locations and objects such as pet related items like feeders, litter boxes, pet watering systems including circulating and outside of the house non circulating, pet toys, pet crate and gate access, pet doors, pet beds, and pet containment systems in a relatively less complex and cost-effective in regard to its use and operation. For these reasons, the present invention is believed to represent a significant advancement in the art, which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A system for controlling pet access to a pet system having an interior compartment comprising:
    an interior compartment within a pet system to be controlled;
    a means for preventing pet access to said interior compartment; and
    a sensor system containing at least two discrete sensors configured and arranged to selectively disengage said means for preventing pet access, comprising:
        at least one tag that provides authorization to access said interior compartment, said at least one tag disposed on an authorized pet;
        a first sensor for detecting said at least one tag and disengaging said means for preventing pet access while said at least one tag is present;
        a second sensor detecting the overall number of animals, tagged or untagged proximate said pet system, wherein, if said second sensor detects the presence of an animal other than said authorized pet, said second sensor overrides said first sensor and engages said means for preventing pet access, and wherein said overriding of said first sensor is carried out even if an authorized tagged pet is still detected by said first sensor.

2. The system of claim 1, wherein said location to be controlled is selected from the group consisting of: pet feeders, pet toys, litter boxes and pet watering systems.

3. The system of claim 1, wherein said second sensor is an infrared sensor.

4. The system of claim 1, wherein said second sensor is an ultrasonic sensor.

5. The system of claim 1, wherein said means for preventing access is engaged when said second sensor detects the presence of an animal other than said authorized pet even if said first sensor detects the presence of said at least one tag.

6. The system of claim 1, wherein said location to be controlled is a pet feeding dish further comprising:
- a housing with a compartment therein;
- a dish for containing food disposed within said compartment;
- said means for preventing access being a door that moves between an open position when said first sensor detects the presence of said at least one tag and a closed position when said second sensor detects the presence of an animal other than said authorized pet.

7. The system of claim 6, wherein said door is closed when said second sensor detects the presence of an animal other than said authorized pet even if said first sensor detects the presence of said at least one tag.

8. The system of claim 6, wherein said dish is removable from said compartment.

9. The system of claim 1, wherein said location to be controlled is a pet feeding dish further comprising:
- a housing including a feeding compartment, a food storage compartment and a means for selectively transporting food from said storage compartment to said feeding compartment;
- a dish for containing food disposed within said feeding compartment;
- said means for preventing access being a door that moves between an open position when said first sensor detects the presence of said at least one tag and a closed position when said second sensor detects the presence of an animal other than said authorized pet.

10. The system of claim 9, wherein said door is closed when said second sensor detects the presence of an animal other than said authorized pet even if said first sensor detects the presence of said at least one tag.

11. The system of claim 9, wherein said dish is removable from said compartment.

12. The system of claim 1, wherein said location to be controlled is a litter box further comprising:
- a housing including a litter compartment;
- said means for preventing access being a door that moves between an open position when said first sensor detects the presence of said at least one tag and a closed position when said second sensor detects the presence of an animal other than said authorized pet.

13. The system of claim 12, wherein said door is closed when said second sensor detects the presence of an animal other than said authorized pet even if said first sensor detects the presence of said at least one tag.

14. The system of claim 1, wherein said location to be controlled is a pet door further comprising:
- a frame configured to be installed into an opening in a door or wall;
- said means for preventing access being a door that is freely displaceable to an open position when said first sensor detects the presence of said at least one tag and is latched in a closed position when said second sensor detects the presence of an animal other than said authorized pet.

15. The system of claim 14, wherein said door is latched when said second sensor detects the presence of an animal other than said authorized pet even if said first sensor detects the presence of said at least one tag.

* * * * *